(12) United States Patent
Hosonuma

(10) Patent No.: US 6,738,172 B2
(45) Date of Patent: May 18, 2004

(54) ROTATING MULTI-FACETED MIRROR FOR AN OPTICAL SCANNING APPARATUS

(75) Inventor: Tasuku Hosonuma, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/385,426

(22) Filed: Mar. 12, 2003

(65) Prior Publication Data

US 2003/0184888 A1 Oct. 2, 2003

(30) Foreign Application Priority Data

Mar. 29, 2002 (JP) ........................................ 2002-094057

(51) Int. Cl.[7] .............................................. G02B 26/08
(52) U.S. Cl. ........................................ 359/216; 359/217
(58) Field of Search ................................. 359/216–219, 359/850, 855, 872

(56) References Cited

U.S. PATENT DOCUMENTS 5,946,124 A * 8/1999 Moon et al.

FOREIGN PATENT DOCUMENTS

| JP | H6-34908 | 2/1994 |
|---|---|---|
| JP | H6-324279 | 11/1994 |

* cited by examiner

Primary Examiner—James Phan
(74) Attorney, Agent, or Firm—Arnold International; Bruce Y. Arnold

(57) ABSTRACT

A rotating multi-faceted mirror of an optical scanning apparatus is disclosed having a plurality of planar reflective surfaces that deflect and scan a light beam incident thereon. Edges, formed as a result of the dihedral angle between adjacent planar reflective surfaces, generate eddy currents which, over time, result in dust being deposited in axially centered regions of the planar reflective surfaces that are used to scan an object by rotating the reflective surfaces about an axis. The reflectance of these regions thus deteriorates over time, causing the scanning beam quality to deteriorate over time. In order to prevent the accumulation of dust in these regions, at a part of each edge corresponding to an axially centered region where a light beam is effectively reflected on the reflective surfaces of the rotating multi-faceted mirror, a notch is formed that passes through the adjacent reflective surfaces that form the edge.

2 Claims, 4 Drawing Sheets

ROTATING MULTI-FACETED MIRROR FOR AN OPTICAL SCANNING APPARATUS

BACKGROUND OF THE INVENTION

The operation of a prior art scanning apparatus to which the present invention pertains will first be explained with reference to FIG. 8. A laser beam L emitted from a laser light source 1 is condensed into a predetermined beam shape by a cylindrical lens 2. The laser beam L is then incident onto the reflective surfaces of a regular-polygon, multi-faceted, mirror 3 that rotates in the direction indicated by the arrow R, and is then imaged by being passed through lens systems 4a and 4b so as to scan an object 5.

However, as shown in FIG. 9(a), in this type of optical scanning apparatus, air currents A, occur around the periphery of the mirror 3 as a result of its rotation in the direction R. As the air currents A, pass over an edge 3b formed by the intersection of two adjacent planar surfaces 3a, 3a the air separates from the downstream planar surface 3a. Where the air currents $A_1$ are separated from the surface 3a, negative pressure is generated, which causes eddy currents $A_2$ to develop within a region W on the planar mirror surface 3a. These eddy currents have a velocity component that is normal to the planar mirror surfaces, resulting in any dust particles that may be present in the air tending to become, over time, adhered to the mirror surface 3a in the area D as shown in FIG. 9(b) for one such mirror surface. The adhesion of dust particles in the area D, as can be seen in FIG. 9(b), occurs in a region that is centered on the mirror surfaces 3a in the axial direction of the rotating mirror. When a single laser beam is made to be incident onto the scanning apparatus, the central part of the mirror surface in the axial direction is an effective region in terms of reflecting the light in a scanning operation. Thus, when dust adheres to the region D, the reflectivity of this region drops dramatically, creating a problem in that the quality of the scanned output image declines.

In Japanese Laid-Open Patent Application H06-34908, technology is disclosed which prevents concentrated adhesion of dust on the mirror surfaces by providing a plurality of rectifying fins on the ends of the rotating multi-faceted mirror. In addition, in the disclosure of Japanese Laid-Open Patent Application H6-324279, technology is disclosed in which the rotating multi-faceted mirror and the motor that causes it to rotate together comprise a rotating unit, such that when the rotating multi-faceted mirror becomes soiled, the rotating unit itself can be replaced.

Among the conventional technologies described in the above-mentioned Japanese laid-open patent publications, the former technology is disadvantageous to making the mirror thin in the axial direction because the fins protrude in the axial direction. There also are concerns about it being difficult to attach the fins, which could lead to a loss in productivity. In addition, concern has also been raised that the fins cutting through the air could generate noise.

On the other hand, the latter technology causes the composition of the casing that houses the optical scanning apparatus to become complicated and costly, and it is also thought that such things as adjusting the optical axis of the rotating multi-faceted mirror after changing the rotating unit could be cumbersome.

BRIEF SUMMARY OF THE INVENTION

The present invention relates to a rotating multi-faceted mirror of an optical scanning apparatus that scans at high speed the light beam of a laser in an image-forming apparatus such as a laser printer. By controlling the adhesion of dust on the mirror surfaces, a mirror which is thin in the axial direction, inexpensive to produce, and does not generate noise can be provided.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
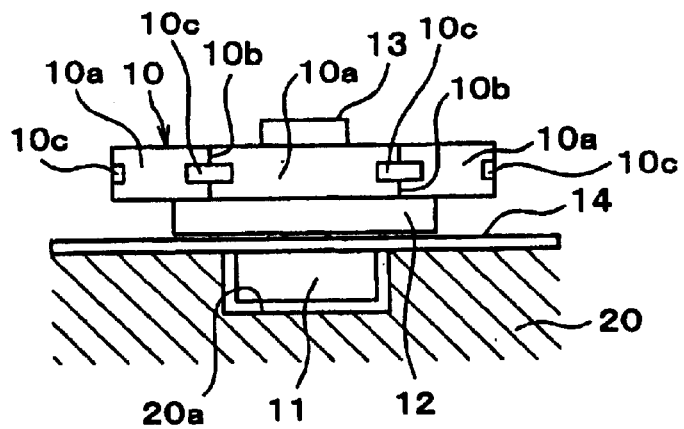
FIG. 1 is a side view of an optical scanning apparatus which uses a rotating multi-faceted mirror according to a first embodiment of the invention.
Figure 2:
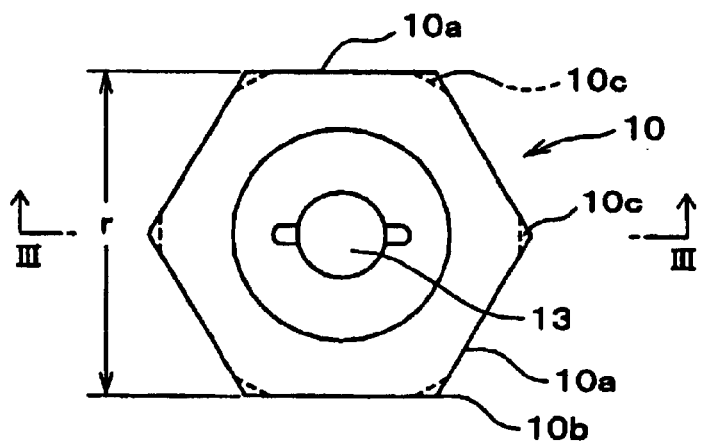
FIG. 2 is a planar view of the rotating multi-faceted mirror according to the first embodiment.
Figure 3:
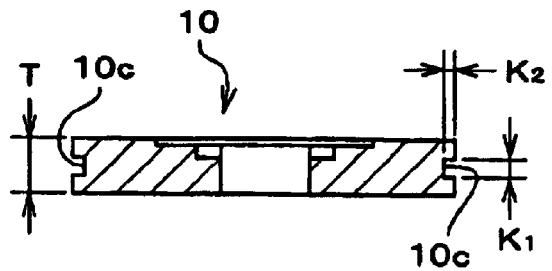
FIG. 3 is a cross-sectional view taken along line III—III in FIG. 2.

The present invention is a rotating multi-faceted mirror of an optical scanning apparatus having a plurality of reflective surfaces that scan light beams emitted from a light source. A dihedral angle is formed at the intersection of adjacent planar reflective surfaces so as to form an edge, and a notch is formed in the central region, axially, of each edge so as to allow air currents to flow through the notch.

With the present invention, when air currents created around the periphery of the rotating multi-faceted mirror pass the dihedral angle between reflective surfaces, the currents are divided into air currents that reach the reflective surface on the downstream side after flowing through the notch, air currents that return to the reflective surface on the downstream side after flowing to the left and right sides of the edge, and air currents that reach the reflective surface on the downstream side after flowing over the edge on either side (left or right) of the notch. Because the diameter of the notch is smaller than the sum of the widths of the edges to the left and right of the notch, the speed of the air currents passing through the notch is slower than the speed of the air currents that flow over the edge formed by the dihedral angle. Consequently, negative pressure regions still occur, resulting again in eddy currents in the region W; however, the pressure in the effective reflective region (i.e., in the center of a mirror, in the axial direction) of the downstream portion of the notch is somewhat higher than on the two sides of the notch. Thus, the eddy currents that occur just downstream of an edge in the effective reflective region are comparatively weak. As a result, dust that is deposited in the effective reflective region is less, with the dust instead tending to adhere to the downstream areas on the left and right sides of the notch, where the pressure is lower. As a result, adhesion of dust on the effective reflective region of the mirror is largely curtailed.

Thus, in the present invention, the effect of curtailing the adhesion of dust onto the effective reflective region as described above is accomplished by the simple means of forming a notch in the edge formed by the dihedral angles. This solution to the dust adhesion problem just downstream of an edge, in the effective reflection region of each planar mirror surface is inexpensive and lends itself well to high productivity. In addition, this solution does not require that the width of the scanning mirror in the axial direction be increased, nor are protrusions provided which effectively increase the width of the scanning mirror. Thus, the present invention enables a scanning mirror to be made thin in the axial direction, while also controlling the generation of noise. In addition, there is no need to exchange the rotating multi-faced mirror for a new one in order to provide a high quality of image scanning that is maintained over time, thereby eliminating the time and effort required to do such things as exchange the mirror and realign the optical axis.

Several preferred embodiments of the present invention will now be described hereafter with reference to the drawings.

Embodiment 1

Figure 4A:
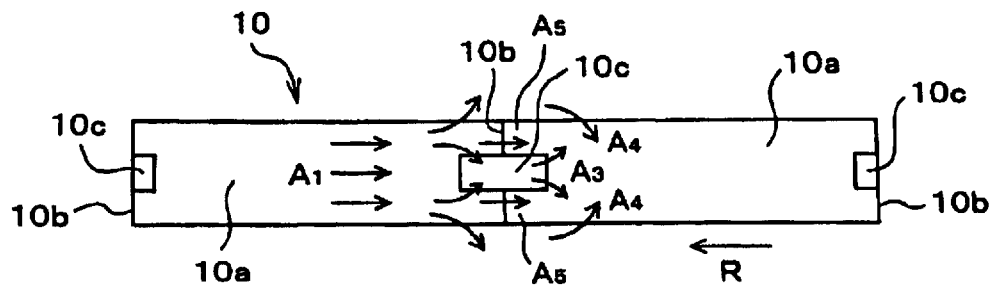
FIGS. 4(a) and 4(b) are side views for explaining the operation of the rotating multi-faceted mirror of FIG. 2.
Figure 4B:
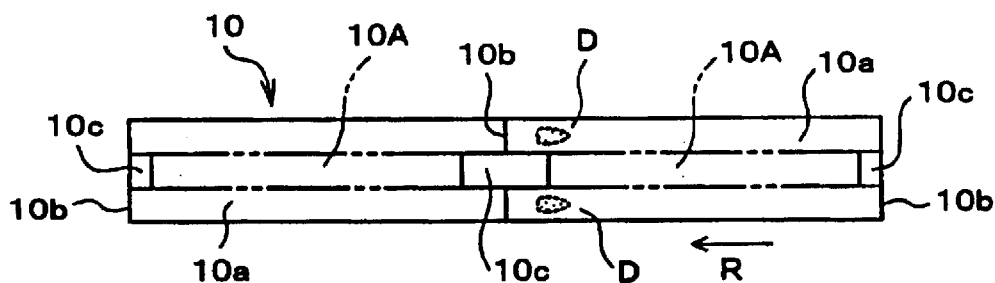
Figure 8:
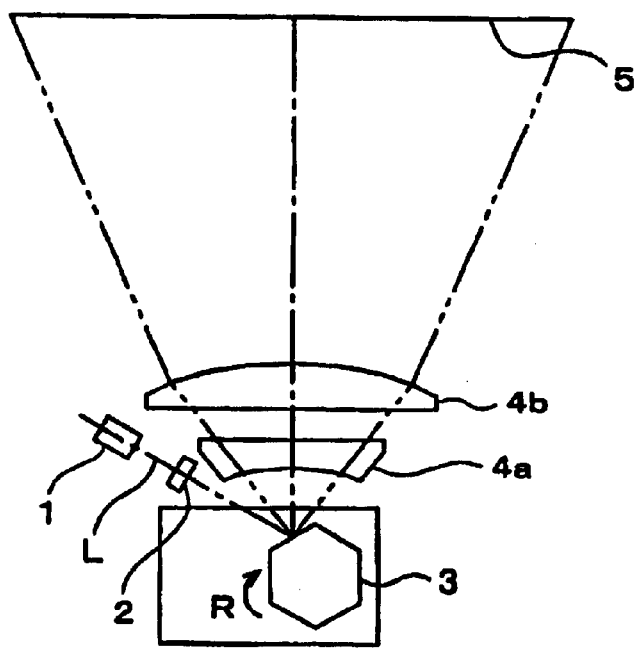
FIG. 8 is a summary diagram explaining the principle of operation of a convention prior art optical scanning system.
Figure 9A:
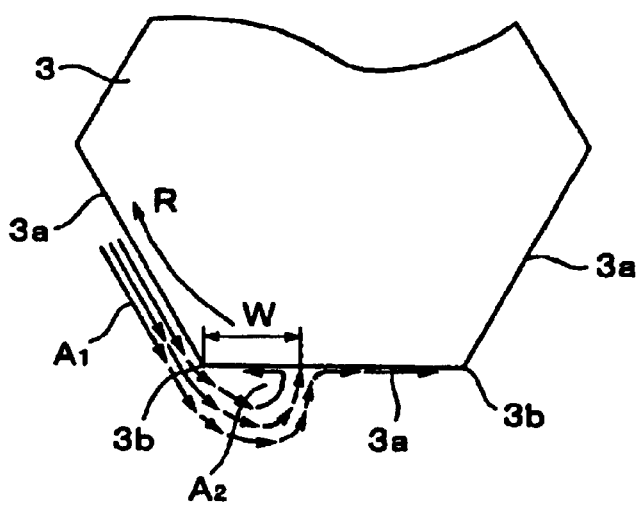
FIG. 9(a) is a plan view and FIG. 9(b) is a side view used to explain the principle of dust adhering to the reflective surface of the rotating multi-faceted mirror.
Figure 9B:
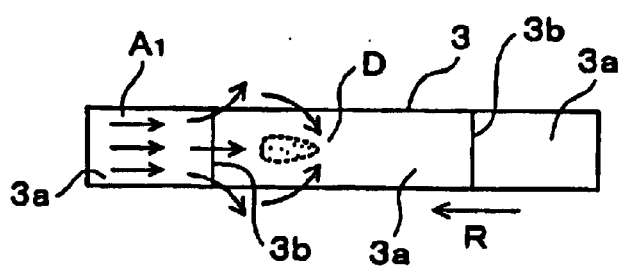

FIG. 1 is a side view of an optical scanning apparatus which uses a rotating multi-faceted mirror according to a first embodiment of the invention. This optical scanning apparatus can be applied to the optical scanning system shown in FIG. 8. Reference number 10 designates the rotating multi-faceted mirror according to this embodiment. As shown in FIGS. 2 through 4(b), the rotating multi-faceted mirror 10 has a moderate depth in the axial direction and has the shape of a polygon (a regular hexagon in the example shown in these figures). An edge 10b is formed by the dihedral angle between neighboring planar reflective surfaces 10a. The rotating multi-faceted mirror 10 in this case scans a single light beam, and as shown in FIG. 4b, with the axially central part of each reflective surface 10a being the effective region where the incident light is reflected and scanned by rotation of the mirror. Referring again to FIG. 1, the rotating multi-faceted mirror 10 is positioned coaxially on top of a disc-like rotor 12 that is rotated by a motor 11, and is pressed onto this rotor 12 by a pressing member 13 positioned in the center of the top edge surface, so as to be fastened into a single unit. The motor 11 is housed in an indentation 20a formed in a housing 20, and the motor 11 is anchored to the substrate 14 which is itself is attached to the housing 20.

In a portion of each edge 10b of the rotating multi-faceted mirror 10, a notch 10c that crosses the edge 10b and passes through to the neighboring reflective surface 10a is formed in the central part in the direction of depth. As shown in FIG. 4(a), this notch 10c has a rectangular shape that is long in the sideways direction when seen from the side, the width thereof is around one-third the depth of the surface, and the notch is formed symmetric to the left and right about the edge 10b. As an example of the dimensions of the rotating multi-faceted mirror 10, the diameter r of an inscribed circle is 36 mm, the depth T is 6 mm, the width $K_1$ of the notch 10c is 2 mm and the maximum depth $K_2$ of the notch 10c is 1 mm.

As shown in FIG. 4(a), around the perimeter of the rotating multi-faceted mirror 10, that is rotated at high speed in one direction (indicated by the arrow R) by a motor, air currents in the opposite direction (indicated by the arrow $A_1$) occur. When these air currents pass the edge 10b, they divide into air currents $A_3$ that reach the reflective surface 10a on the downstream side by passing through the notch 10c, air currents $A_4$ that return to the reflective surface 10a on the downstream side after flowing to the two edge surfaces, and air currents $A_5$ that reach the reflective surface 10a on the downstream side by passing over the edge 10b on both sides of the notch 10c. Because the width of the notch 10c is less than the combined widths of the edges to the left and right of the notch, the speed of the air currents $A_3$ that pass through the notch 10c is slower than the speed of the air currents $A_5$ that cross over the edge 10b.

Consequently, immediately downstream of the edge, negative pressure is generated. However, in the axially central part of a mirror surface 10a the air pressure just downstream of a notch 10c, that is to say the pressure in the effective region for scanning a light beam, is somewhat larger than either side thereof. Thus, any eddy currents that occur in the region 10a where an incident light beam is effectively scanned are relatively weak, resulting in the areas where dust gets deposited over time being on the left and right sides of the effective reflective region 10A. Thus, as shown in FIG. 4(b), the dust adheres in the regions D, on either side of the effective region for scanning the incident light. Accordingly, the generation of clouding of the mirror surface due to the adhesion of dust is mitigated in the region that is used to scan a light beam, and the quality of scanned images is maintained stable over time.

With the rotating multi-faceted mirror 10 of this embodiment, the above-described effect of mitigating dust adhesion in regions of the mirror surfaces that are used to scan an incident light beam is achieved by simply forming a notch 10c in the edges 10b. Thus, this embodiment is easy to produce. In addition, there is no need to increase the axial depth of the mirror surfaces nor are there protrusions, so this embodiment provides a mirror that is thin in the axial direction and does not generate undesirable noise when rotating at high speed.

Embodiment 2

Figures 5A, 5B:
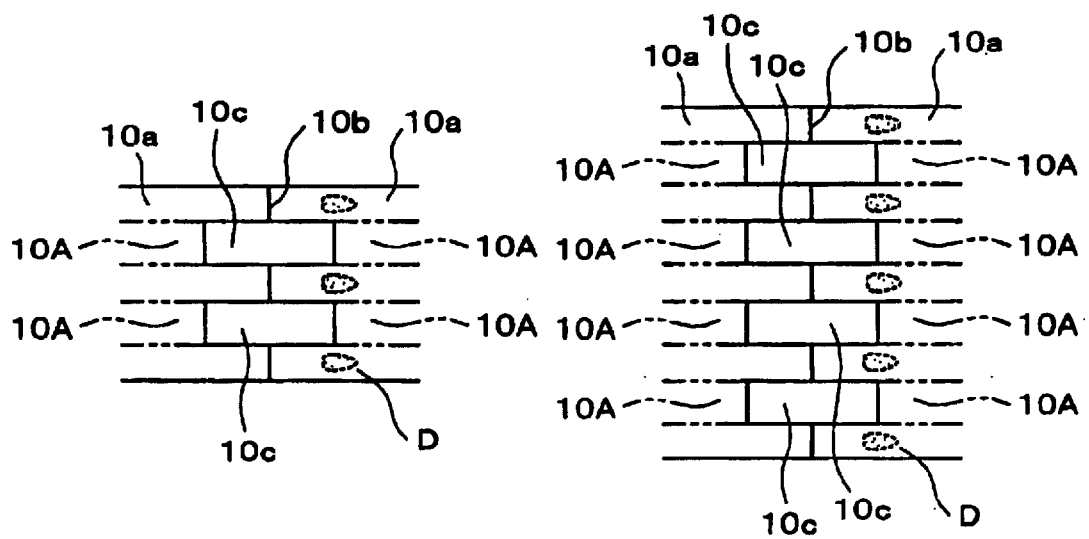
FIGS. 5(a) and 5(b) are side views showing configurations according to a second embodiment of the invention.

FIGS. 5(a) and 5(b) show configurations according to a second embodiment of a rotating multi-faceted mirror that is capable of scanning a plurality of incident light beams. This embodiment is similar to that of Embodiment 1, except that the rotating multi-faceted mirror shown in FIG. 5(a) is designed to simultaneously scan two light beams, and the rotating multi-faceted mirror shown in FIG. 5(b) is designed to simultaneously scan four light beams. Furthermore, in each effective reflective region 10A where an incident light beam is reflected, a notch 10c that operates the same as described above is formed in the edge 10b. Just as in Embodiment 1, due to these notches 10c, dust is guided to the left and right sides of the effective reflective regions 10A so that clouded regions D develop with time on portions of the mirror surfaces that are positioned to the left and right of the regions 10A that are used to scan the incident light.

Embodiment 3

Figure 6A:
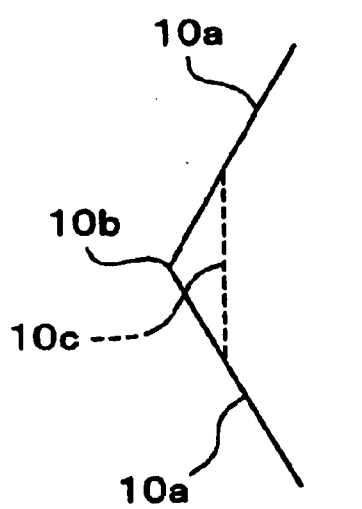
FIGS. 6(a) through 6(c) are plan views of a dihedral angle formed by adjacent planar scanning surfaces 10a, 10a showing different cross-sectional shapes of notches according to a third embodiment of the invention.
Figure 6B:
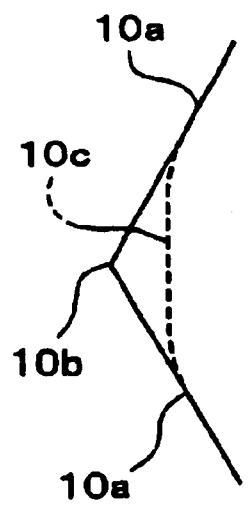
Figure 6C:
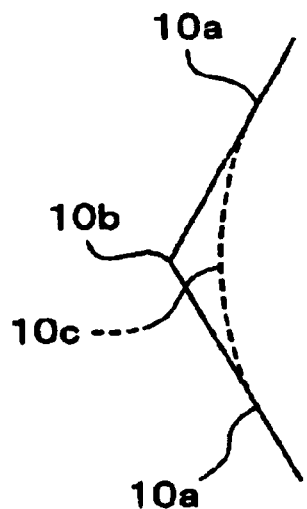

As shown by the dotted line in FIG. 6(a), the notch 10c in the above-described embodiments has a flat bottom surface over its entire length; however, the bottom surface may be beveled at both ends, as shown by the dotted line in FIG. 6(b), or the notch can have a curved bottom surface that runs substantially along the circumferential direction of the rotating multi-faceted mirror, as shown by the dotted line in FIG. 6(c). FIG. 6(c) is the best design in terms of reducing noise and preventing a low pressure region from developing downstream of the notch. Moreover, the effect of scattering dust to the two sides of the effective reflective region, where the pressure is relatively low, is heightened.

Figure 7A:
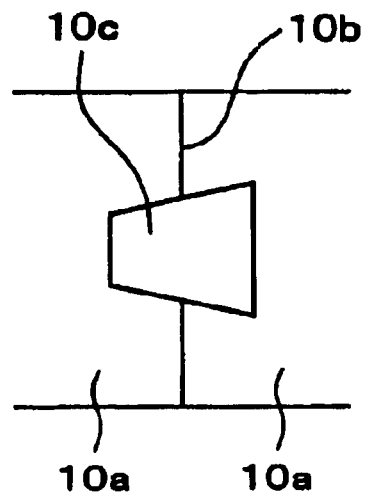
FIGS. 7(a) and 7(b) are side views of a dihedral angle formed by the planer scanning surfaces 10a, 10a showing the shapes of notches according to the third embodiment of the invention.
Figure 7B:
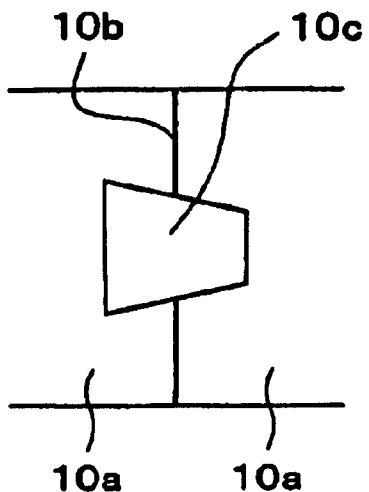

FIGS. 7(a) and 7(b) show alternative designs for the notch, as viewed from above an edge 10b. In FIG. 7(a) a trapezoidal notch 10c is shown with its width expanding in the air flow direction (i.e., opposite the direction of rotation R of the rotating multi-faceted mirror). Conversely, in FIG. 7(b), a trapezoidal notch 10c is shown with its width narrowing in the air flow direction (i.e., opposite the direction of rotation R of the rotating multi-faceted mirror). In this manner, it is possible to decelerate (as in FIG. 7(a)) or accelerate (as in FIG. 7(b)) the velocity of the air flowing through the notch by changing the cross-section of the notch as the air flows through it, thereby enabling minute adjustments in the position where dust adheres.

The invention being thus described, it will be obvious that the same may be varied in many ways. For example, the notches may be of different shapes than those illustrated. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A rotating multi-faceted mirror of an optical scanning apparatus having a plurality of planar reflective surfaces that deflect and scan a light beam emitted from a light source, with edges formed as a result of the dihedral angle between adjacent planar reflective surfaces; wherein, at a part of an edge corresponding to an axially centered region where a light beam is effectively reflected on the reflective surfaces of the rotating multi-faceted mirror, a notch is formed that passes through the adjacent reflective surfaces that form said edge, wherein the notch forms a channel that has a cross-sectional area that changes in a manner that causes air passing within the channel to accelerate when the rotating multi-faceted mirror is rotated at a constant rate.

2. A rotating multi-faceted mirror of an optical scanning apparatus having a plurality of planar reflective surfaces that deflect and scan a light beam emitted from a light source, with edges formed as a result of the dihedral angle between adjacent planar reflective surfaces; wherein, at a part of an edge corresponding to an axially centered region where a light beam is effectively reflected on the reflective surfaces of the rotating multi-faceted mirror, a notch is formed that passes through the adjacent reflective surfaces that form said edge, wherein the notch forms a channel that has a cross-sectional area that changes in a manner that causes air passing within the channel to decelerate when the rotating multi-faceted mirror is rotated at a constant rate.

* * * * *